(12) United States Patent
Koh et al.

(10) Patent No.: US 6,567,871 B2
(45) Date of Patent: May 20, 2003

(54) METHOD AND APPARATUS FOR REPEATING (EXTENDING) TRANSACTIONS ON A BUS WITHOUT CLOCK DELAY

(75) Inventors: Lee K. Koh, Tempe, AZ (US); Joseph Murray, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/361,367

(22) Filed: Jul. 26, 1999

(65) Prior Publication Data

US 2002/0188794 A1 Dec. 12, 2002

(51) Int. Cl.[7] .............................................. G06F 13/00
(52) U.S. Cl. ....................................... 710/110; 710/310
(58) Field of Search ................................. 710/309, 305, 710/310, 306, 314, 52, 29, 31, 110

(56) References Cited

U.S. PATENT DOCUMENTS 5,265,211 A * 11/1993 Amini et al. ................. 710/36
5,964,859 A * 10/1999 Steinbach et al. ........... 710/129
6,070,209 A * 5/2000 Hausauer ..................... 710/104
6,243,817 B1 * 6/2001 Melo et al. .................. 713/300
6,301,630 B1 * 10/2001 Chen et al. .................. 710/129

* cited by examiner

*Primary Examiner*—Sumati Lefkowitz
*Assistant Examiner*—X. Chung-Trans
(74) *Attorney, Agent, or Firm*—Blakely, Sokoloff, Taylor & Zafman LLP

(57) ABSTRACT

A method and apparatus is described that is related to repeating (extending) transactions on a bus. A plurality of buffer pairs are configured to direct a plurality of signals between a first bus and a second bus in a bus cycle. A circuit is configured to monitor a control signal to determine a bus location of a master device and the circuit is further configured to enable one buffer in the buffer pairs to control a direction of the plurality of signals between the first bus and the second bus.

18 Claims, 6 Drawing Sheets

METHOD AND APPARATUS FOR REPEATING (EXTENDING) TRANSACTIONS ON A BUS WITHOUT CLOCK DELAY

FIELD OF THE INVENTION

The present invention relates to repeating/extending a bus in a bus architecture.

BACKGROUND

FIG. 1 is used to aid in the understanding of the concept of a master device and a slave device in a bus system as well as related signals. In this instance, the Peripheral Component Interconnect (PCI) bus architecture is used as an example to describe the concept. Coupled to the PCI bus A0 are a plurality of devices 11, 12, 13 designated as device A, device B and device C. These devices 11, 12, 13 may be Input/Output (I/O) Controller, Direct Memory Access (DMA) Controller, Memory Controller and so forth which are capable of obtaining ownership of the PCI bus. A device that is capable of obtaining ownership of the PCI bus is known as a master device.

Generally, only one master device can own the bus at a time. The reason is that if two or more master devices own the bus at a time, address, data as well as control signals of one device will interfere with the signals of the other device. The determination as to which device is to own the PCI bus A0 is performed by an arbiter device 14. The arbiter device 14 typically grants access and ownership of the PCI bus A0 to one master device 11, 12, 13 based on an arbitration scheme. The master devices 11, 12, 13 are connected to the arbiter device 14 by individual control signal lines which are the request signal lines REQ#1, REQ#2, REQ#3 and the grant signal lines GNT#1, GNT#2, GNT#3. Any master device 11, 12, 13 that wishes to control the PCI bus A0 sends a request signal to the arbiter device 14 through the respective request signal lines REQ#1, REQ#2, REQ#3. Arbitration is performed where two or more request signals are received by the arbiter device 14 within the same time period. In one example, the arbitration may be merely determining the priority of the master devices 11, 12, 13 making the request. Once the determination is made, the arbiter device 14 issues a grant signal to that master device with the highest priority. For example, if device A 11 is determined to have the highest priority, the arbiter device 14 issues a grant signal over the grant signal line GNT#1 to the device A 11. The granted device A 11 can now assert control over the PCI bus A0 to perform its bus cycle and is the master device of the cycle. The device that the master device seeks to control is known as a slave device.

In this example, the slave device may be the memory device 15. Once the master device A 11 gains control of the PCI bus A0, the master device A 11 makes attempt to communicate with the slave device 15 by generating a control signal. When the slave device 15 acknowledges the control signal and places itself in the control of the master device A 11, a master-slave relationship is established.

FIG. 2 illustrates a handshaking protocol that is exchanged between a master device and a slave device during a bus cycle. The signal lines C/BE#, FRAME# and IRDY# are asserted by the master device. The signals TRDY# and DEVSEL# are asserted by the slave device. The AD signal lines will be discussed later. Generally, the protocol exchange may occur as follows. During the initial bus cycle, the master device asserts the FRAME# signal line to announce that an address and a command exist on the AD and the C/BE# signal lines, respectively. All potential slave devices receive the signal from the FRAME# signal line and prepare to receive the address. The master device may then drive the AD and the C/BE# lines following the announcement. The slave devices decode the address and the slave device which has an address match announces its presence by asserting the DEVSEL# signal line. The C/BE# signal line indicates to the slave devices whether the bus cycle is a write cycle or a read cycle. If it is a write cycle, the master device drives the data to the slave device through the AD signal lines. If it is a read cycle, the slave device drives the data to the master device through the AD signal lines. The transmission of data occurs when both the master device and the slave device have asserted the IRDY# signal the TRDY# signal respectively.

In certain instances, it is desirable for the master devices and the slave devices coupled to the PCI bus to be able to communicate with the master devices and the slave devices connected to a bus external to the PCI bus. The characteristics of the external bus is similar to the PCI bus and thus mirroring the address, data and control signals is sufficient. However, in one known method, such bus-to-bus connection is performed by a PCI-to-PCI bridge. A bridge generally allows transactions to occur between a master or a slave device in a first bus and a master and a slave device in a second bus. However, a bridge generally assumes that an address translation takes place between the address memory space of the first bus and the address space of the second bus. Furthermore, the bridge assumes that data is translated to match the data size of the first bus to the second bus. Furthermore, the bridge assumes that the control signals are translated such that a protocol between the first bus and the second bus can be established. Accordingly, a bridge is generally a large and complex circuitry requiring many latency cycles to perform the various transactions described above. Where a bus mirroring is to be performed, such complexity should not be required.

In another instance, the PCI bus described above is not accessible to the external world. Where the behavior of the bus is desired to be known in real time such as the handshaking protocol occurring between the devices coupled to the bus, the behavior remains unknown because there is no access to the bus. In this instance, bus mirroring with an external bus is desirable because by observing the behavior of the external bus that mirrors the internal bus, the behavior of the internal bus can be determined.

SUMMARY

A method and apparatus is described that is related to repeating (extending) transactions on a bus. A plurality of buffer pairs are configured to direct a plurality of signals between a first bus and a second bus in a bus cycle. A circuit is configured to monitor a control signal to determine a bus location of a master device and the circuit is further configured to enable one buffer in the buffer pairs to control a direction of the plurality of signals between the first bus and the second bus.

Other features and advantages of the present invention will be apparent from the accompanying drawings and detailed description to be followed.

DETAILED DESCRIPTION

A PCI repeater that repeats or mirrors transactions occurring in one bus onto another bus is disclosed. The PCI repeater allows master and slave devices on one bus to communicate with master and slave devices on another bus without clock delays. Certain control signals related to the master devices and slave devices are monitored. From the monitored signals, the path flow of the address, data and control signals between the granted master device and its slave device are controlled. In the following description, numerous specific details are given to provide a through understanding of the invention. In particular, the invention is described in terms of the Peripheral Component Interconnect (PCI) bus architecture. However, such description should not be construed as limitations and the invention may be practiced on other forms of bus architecture.

Figure 3:
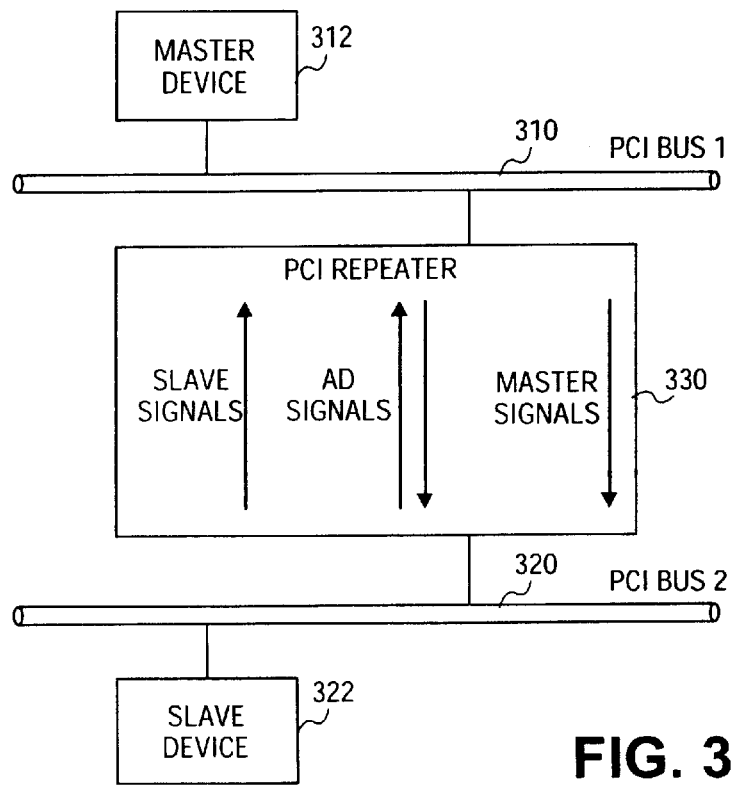
FIG. 3 illustrates a PCI repeater that directs address, data and control signals in one mode in accordance with an embodiment of the invention.

FIG. 3 illustrates an example where a PCI master device 312 is coupled to a PCI bus A 310 and a slave device 322 is coupled to a separate PCI bus B 320. In accordance with an embodiment of the invention, the PCI bus A 310 and the PCI bus B 320 are coupled together through a PCI repeater 330. In this example, the PCI repeater 330 mirrors the bus protocol that occurs in the PCI bus A 310 to which the master device 312 is coupled. The PCI repeater 330 directs the master signals asserted by the master device 312 from the PCI bus A 310 to the PCI bus B 320. The PCI repeater 330 also mirrors the bus protocol that occurs in the PCI bus B 320 to which the slave device 322 is coupled. The PCI repeater 330 directs the slave signals asserted by the slave device 322 from the PCI bus B 320 to the PCI bus A 310. The AD signals are dynamic that change in direction depending upon whether the bus cycle is a write cycle or a read cycle. In the write cycle, during the address mode and the data mode, the PCI repeater 330 mirrors and directs the AD signals from the PCI bus A 310 to the PCI bus B 320. In the read cycle, during the address mode, the PCI repeater 330 mirrors and directs the AD signals from the PCI bus A 310 to the PCI bus B 320. However, in the data mode, the PCI repeater 330 mirrors and directs the AD signals from the PCI bus B 320 to the PCI bus A 310.

Figure 4:
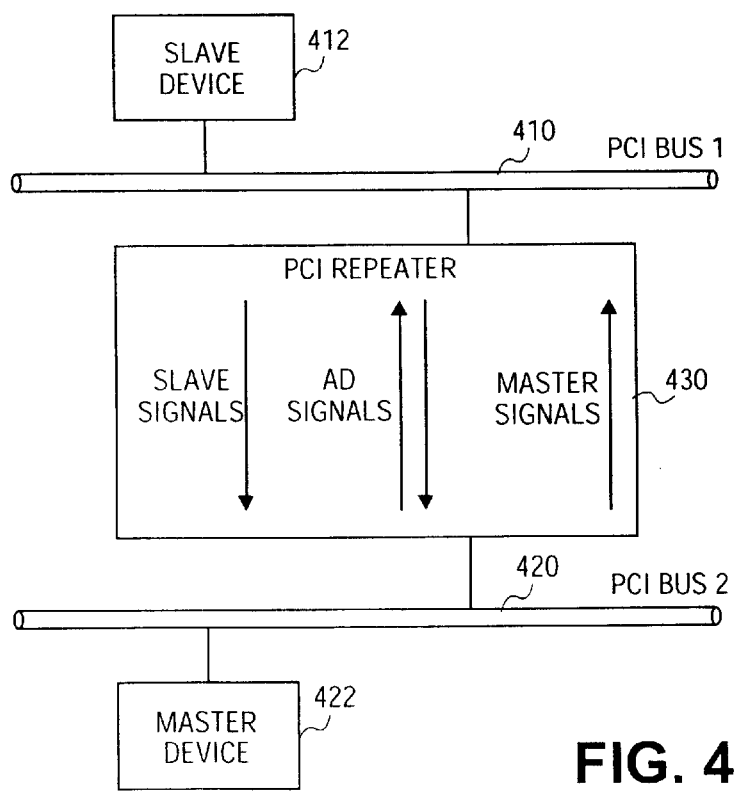
FIG. 4 illustrates the PCI repeater that directs address, data and control signals in another mode in accordance with an embodiment of the invention.

FIG. 4 illustrates an example where a PCI slave device 412 is coupled to a PCI bus A 410 and a PCI master device 422 is coupled to a PCI bus B 420. In accordance with an embodiment of the invention, PCI bus A 410 and PCI bus B 420 are coupled together through a PCI repeater 430. In this example, the PCI repeater mirrors the bus protocol that is occurring in the PCI bus A 410 to which the slave device 412 is coupled. The PCI repeater 430 directs the slave signals asserted by the slave device 412 from the PCI bus A 410 to the PCI bus B 420. The PCI repeater 430 also mirrors the bus protocol that is occurring in the PCI bus B 420 to which the master device 422 is coupled. The PCI repeater 430 directs the master signals asserted by the master device 422 from the PCI bus B 420 to the PCI bus A 410. As mentioned above, the AD signals are dynamic and change direction depending upon whether the bus cycle is a write cycle or a read cycle. In the write cycle, during the address and data mode, the PCI repeater 430 mirrors and directs the AD signals from the PCI bus B 420 to the PCI bus A 410. In the read cycle, during the address mode, the PCI repeater 430 mirrors and directs the AD signals from the PCI bus B 420 to the PCI bus A 410. In the data mode, the PCI repeater 430 mirrors and directs the AD signals from the PCI bus A 410 to the PCI bus B 420.

Table 1 summarizes the direction of the AD signals directed by the PCI repeater in the address mode relative to the location of the master and slave device and whether it is a write cycle or a read cycle.

TABLE 1

| Transaction Type | Master | Slave | Ad Bus Direction |
| --- | --- | --- | --- |
| Read | Bus A | N/A | Towards Bus B |
|  | Bus B |  | Towards Bus A |
| Write | Bus A | N/A | Towards Bus B |
|  | Bus B |  | Towards Bus A |

Note that in the address mode, regardless of the location of the slave device, or whether it is a write cycle, the PCI repeater directs the AD signals away from the PCI bus on which the master device is located.

Table 2 summarizes the direction of the AD signals directed by the PCI repeater in the data mode relative to the location of the master and slave device and whether it is a write cycle or a read cycle.

TABLE 2

| Transaction Type | Master | Slave | Ad Bus Direction |
| --- | --- | --- | --- |
| Read | N/A | Bus A | Towards Bus B |
|  |  | Bus B | Towards Bus A |
| Write | Bus A | N/A | Towards Bus B |
|  | Bus B |  | Towards Bus A |

Note that in the data mode, if the transaction is a read cycle, regardless of the location of the master device, the PCI repeater directs the AD signals away from the PCI bus on which the slave device is located. If the transaction is a write cycle, regardless of the location of the slave device, the PCI repeater directs the AD signals away from the PCI bus on which the master device is located.

Figure 5:
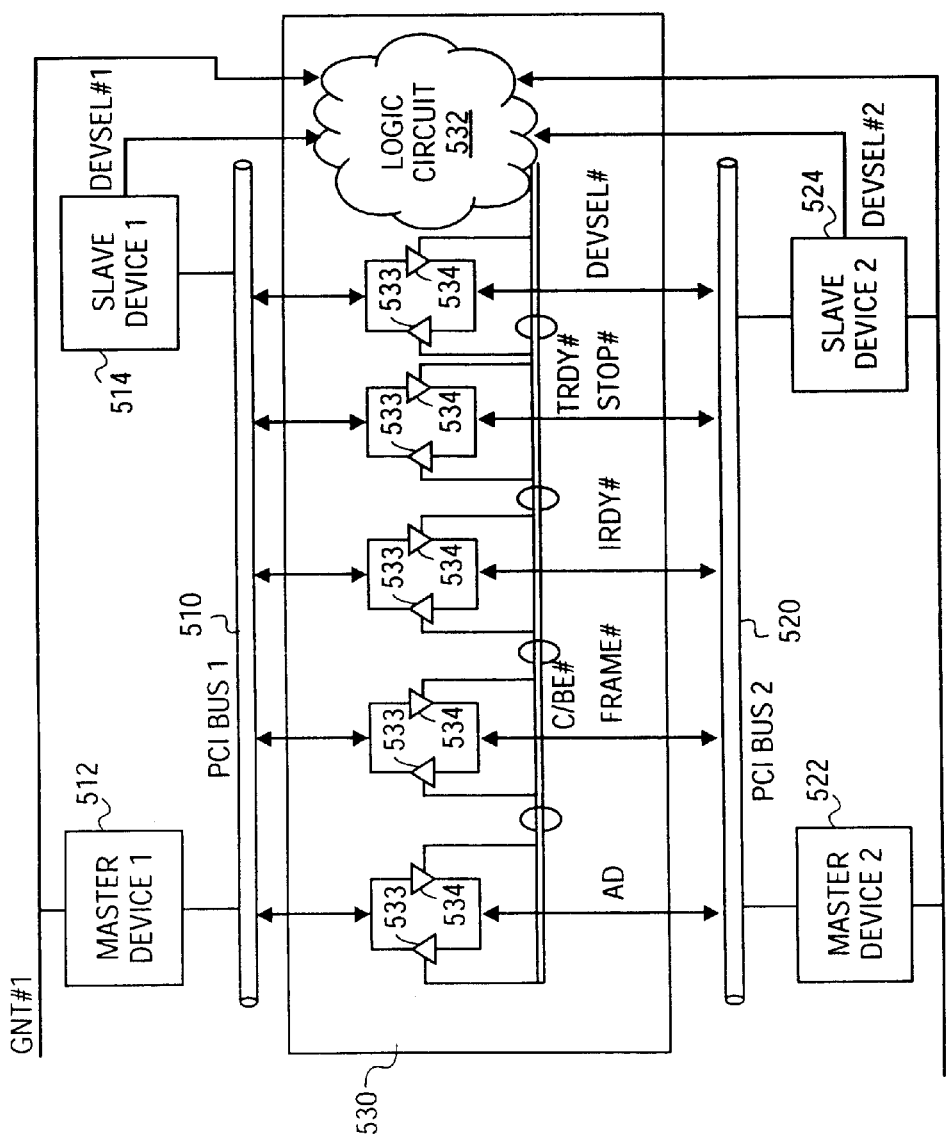
FIG. 5 is a configuration of a PCI repeater in accordance with an embodiment of the invention.

FIG. 5 is a PCI repeater in accordance with an embodiment of the invention. In this embodiment, the PCI repeater 530 comprises a plurality of tristate buffer pairs 533, 534 which are able to direct address, data and control signals in either direction between the PCI bus A 510 and the PCI bus B 520. The PCI repeater 530 further comprises a logic circuit 532 that controls the gates of the tristate buffer pairs 533, 534 thereby controlling the direction of the signals. When the PCI repeater is not in operation, the logic circuit 532 deactivates the tristate buffer pairs 533, 534 thereby electrically isolating the connection of the PCI bus A 510 from the PCI bus B 520. When the PCI repeater is in operation, from the logic derived from tables 1 and 2 above, the logic circuit 532 activates one of the buffers in the tristate buffer pairs 533, 534 to direct the flow of signals from one PCI bus to another.

Figure 1:
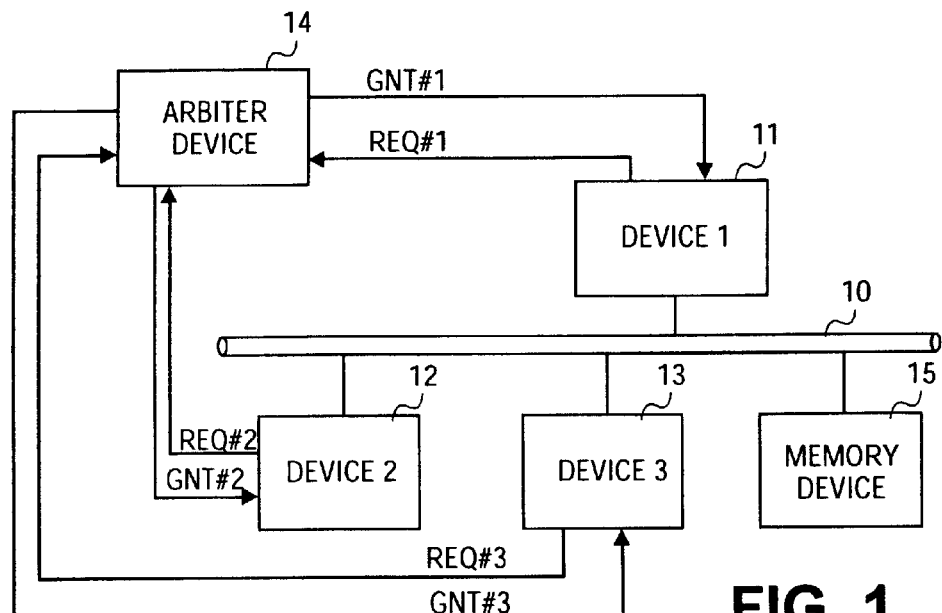
FIG. 1 illustrates a bus architecture used to aid in the understanding of the concept of a master device and a slave device as well as related signals.
Figure 2:
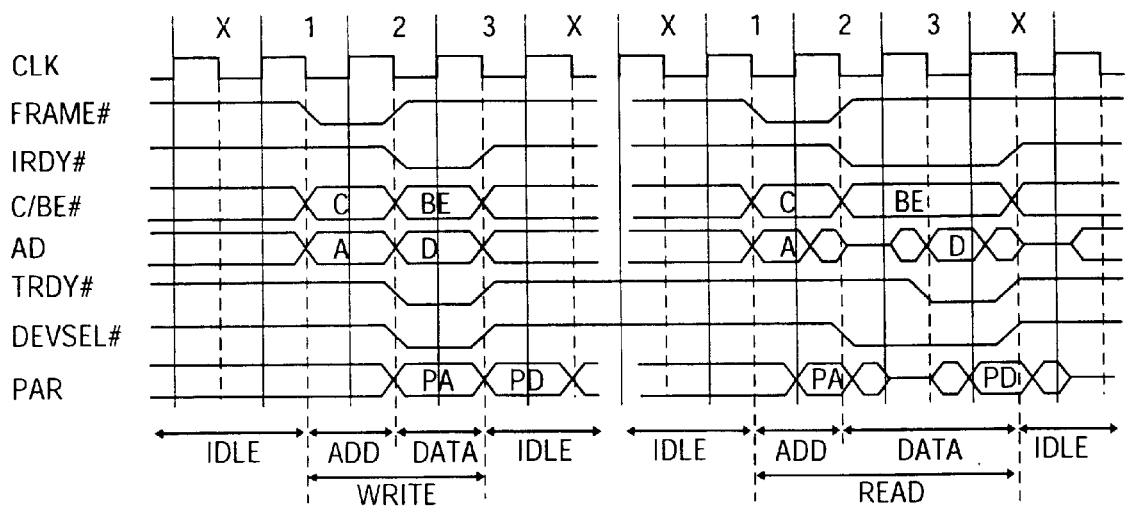
FIG. 2 illustrates a handshaking protocol that is exchanged between a master device and a slave device.

The logic circuit 532 determines the location of the master device during a bus cycle by monitoring the grant signals on the grant lines GNT#1, GNT#2 generated by the arbiter device 14 (see FIG. 1). For example, if the logic circuit 532 detects a grant signal from the grant signal line GNT#1, the logic circuit 532 is able to determine that the master device 512 is located on the PCI bus A 510. Once the determination is made, the logic circuit 532 activates the appropriate buffers of the buffer pairs 533, 534 to direct the master device signals C/BE#, FRAME#, IRDY# to flow towards PCI bus B 520 (i.e. directs master signals away from the bus on which the master device is located) and the slave device signals DEVSEL#, TRDY#, STOP# to flow towards PCI bus A 510 (i.e. direct slave signals to the bus on which the master device is located). Additionally, the logic circuit 532 directs the AD signals to flow toward the PCI bus B, 520. When the master device asserts the C/BE# signal, the logic circuit 532 is able to determine if the cycle is a write cycle or a read cycle. If the cycle is a write cycle, the logic circuit 532 maintains the AD signals flow direction for both the address mode and the data mode of the transaction.

If the cycle is a read cycle, the logic circuit 532 determines the location of the slave device by monitoring the device select signal DEVSEL# generated by the acknowledging slave device. If the logic circuit 532 detects the signal DEVSEL#1, the logic circuit 532 is able to determine that the slave device 514 is located on the PCI bus A 510. Because the master device 512 and the slave device 514 are located on the same bus, the logic circuit 532 does not perform further action on the direction of the AD signals during the data mode. If the logic circuit 532 detects the signal DEVSEL#2, the logic circuit 532 is able to determine that slave device 524 is located on the PCI bus B 520. In this instance, the logic circuit 532 maintains the initial direction of the AD signals during the address mode and then activates the appropriate buffers on the buffer pairs 533, 534 to direct the AD signals to flow toward the PCI bus A 510 during the data mode.

If the logic circuit 532 detects a grant signal from the grant signal line GNT#2, the logic circuit 532 is able to determine that the master device 522 is located on the PCI bus B 520. Once the determination is made, the logic circuit 532 activates the appropriate buffers of the buffer pairs 533, 534 to direct the master devices signals C/BE#, FRAME#, IRDY# to flow towards PCI bus A 510 and the slave device signals DEVSEL#, TRDY#, STOP# to flow towards PCI bus B 520. Additionally, the logic circuit 532 directs the AD signals to flow toward the PCI bus A 510. When the master device asserts the C/BE# signal, the logic circuit 532 is able to determine if the cycle is a write cycle or a read cycle. If the cycle is a write cycle, the logic circuit 532 maintains the flow direction for both the address mode and the data mode of the transaction.

If the cycle is a read cycle, the logic circuit 532 determines the location of the slave device by monitoring the device select signal DEVSEL# generated by the acknowledging slave device. If the logic circuit 532 detects the signal DEVSEL#1, the logic circuit 532 is able to determine that the slave device 514 is located on the PCI bus A 510. In this instance, the logic circuit 532 maintains the initial direction of the AD signals during the address mode and then activates the appropriate buffers on the buffer pairs 533, 534 to direct the AD signals to flow toward the PCI bus B 520 during the data mode. If the logic circuit 532 detects the signal DEVSEL#2, the logic circuit 532 is able to determine that the slave device 524 is located on the PCI bus B 520. Because the master device 522 and the slave device 524 are located on the same bus, the logic circuit 532 does not perform further action on the direction of the AD signals during the data mode.

Below is an exemplary signals grouping that may be used in which the direction of the signals are controlled by the tristate buffer pairs. The grouping also allows the PCI repeater 530 to detect the various signals with ease thereby allowing simplicity in the PCI repeater logic circuitry.

1) AD
2) C/BE#, FRAME#
3) IRDY#
4) TRDY#, STOP#
5) DEVSEL#

The logic circuit 532 that controls the tristate buffer pairs 533, 534 are performed by two state machines which for purposes of identification will be designated a master repeater and a slave repeater. The two state machines track the progress of all transactions that occurs in a bus cycle and enable the appropriate buffers of the tristate buffer pairs 533, 534 thereby ensuring a correct signals flow direction at all times.

Figure 6:
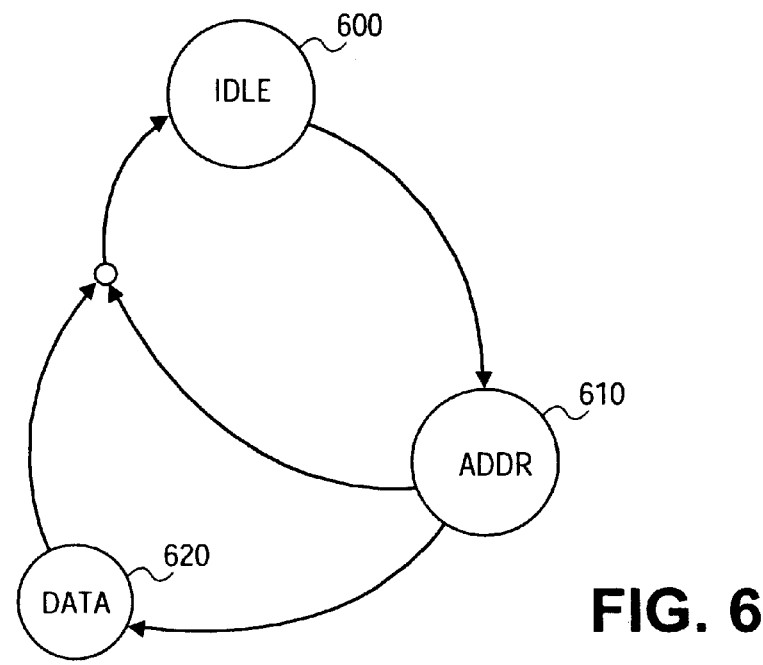
FIG. 6 is a state diagram of a master repeater in accordance with an embodiment of the invention.

FIG. 6 is a state diagram of a master repeater according to an embodiment of the invention. The master repeater comprises of three states: idle state 600; address state 610; and data state 620. To aid in the understanding of the embodiment, one PCI bus will be termed internal bus with its associated internal master device and slave device. The other PCI bus will be termed external bus with its associated external master device and slave device. According to the embodiment, in the idle state 600, the master repeater directs the master signals, the slave signals and the AD signals according to a predetermined direction. In one embodiment, the master repeater directs the master signals and the AD signals toward the external bus and directs the slave signals towards the internal bus. In another embodiment, the master repeater directs the master signals and the AD signals towards the internal bus and directs the slave signals toward the external bus. Taking the former embodiment as an example, no further action is performed by the master repeater if an internal master device is granted ownership of the bus. The master repeater is taken out of the idle state 600 when an external master device is granted the bus. During transition to the address state 610, the master repeater performs the following actions: The master repeater resets the buffers such that the master signals and the AD signals are directed toward the internal bus and the slave signals are directed toward the external bus. However, at the address state 600, if the external master device loses ownership of the bus, a transition back to the idle state occurs. As the master repeater transitions back to the idle state 600, the master repeater resets the buffers such that the master signals and the AD signals are directed toward the external bus and the slave signals are directed toward the internal bus. Otherwise, the master repeater transitions to the data state 620 from the address state 610 when the external master device asserts the FRAME# signal. The master repeater does not perform any actions on the buffers. When the external master device terminates the ownership of the bus, the master repeater transitions from the data state 620 to the idle state 600. As the master repeater transitions back to the idle state, the master repeater resets the buffers to direct the master signals and the AD signals toward the external bus and directs the slave signals toward the internal bus.

Figure 7:
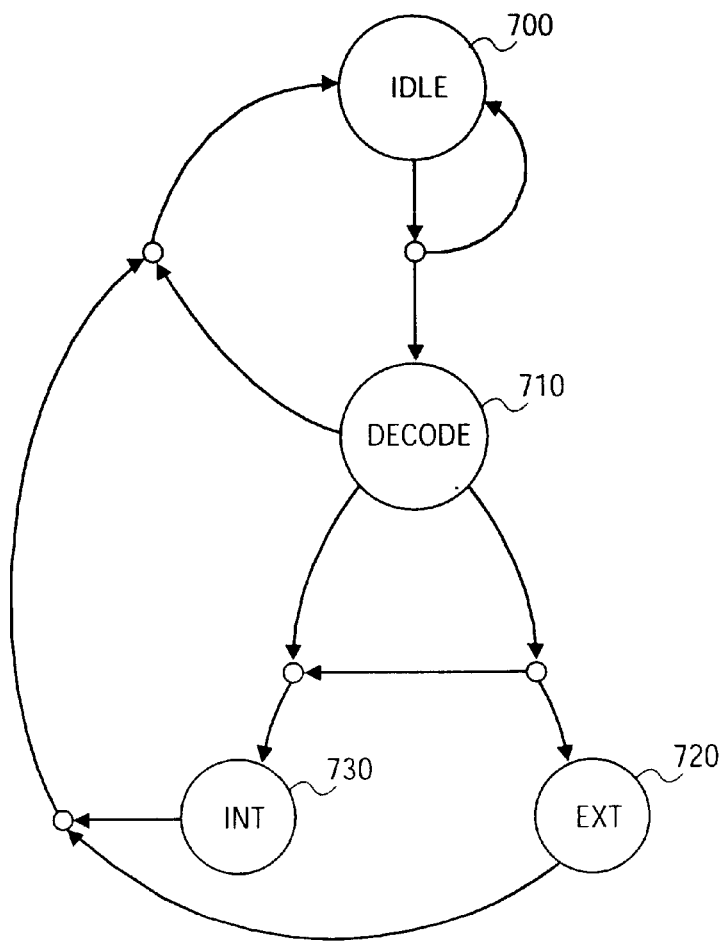
FIG. 7 is a state diagram of a slave repeater in accordance with an embodiment of the invention.

FIG. 7 is a diagram of the slave repeater state machine in accordance with an embodiment of the invention. The slave repeater comprises four states: idle state 700, decode state 710, external state 720 and internal state 730. According to the embodiment, the slave repeater is taken out of the idle state 700 and into the decode state 710 when the slave repeater detects a FRAME# signal. During the transition to the decode state 710, if the slave repeater no longer detects the FRAME# signal, the slave repeater reverts back to the idle state 700. Otherwise, during the transition, the slave repeater determines if the transaction is a read cycle. This is performed by monitoring the C/BE# signal. If the slave repeater detects a read cycle, the slave repeater determines whether the slave device is located on the external bus or on the internal bus. This determination is performed by detecting the DEVSEL# signal. If the DEVSEL# signal originates from the external bus, the slave repeater determines the slave device to be located on the external bus. If the DEVSEL# signal originates from the internal bus, the slave repeater determines the slave device to be located on the internal bus. In the decode state 710, if the slave repeater does not detect a DEVSEL# signal and the master device terminates the cycle, the slave repeater reverts backs to the idle state 700. If the slave repeater determines the slave device is located on the external bus, the slave repeater transitions to the external state 720. At the external state 720, the slave repeater sets the buffers to direct the AD signals from the external bus to the internal bus in the data mode. If the slave repeater determines the slave device is located on the internal bus, the slave repeater transitions to the internal state 730. At the internal state 730, the slave repeater sets the buffers to direct the AD signals from the internal bus to the external bus in the data mode. If the slave repeater does not detect both IRDY# signal and TRDY# signal or the slave repeater does detect a STOP# signal, the slave repeater reverts back to the idle state 700.

Figure 8:
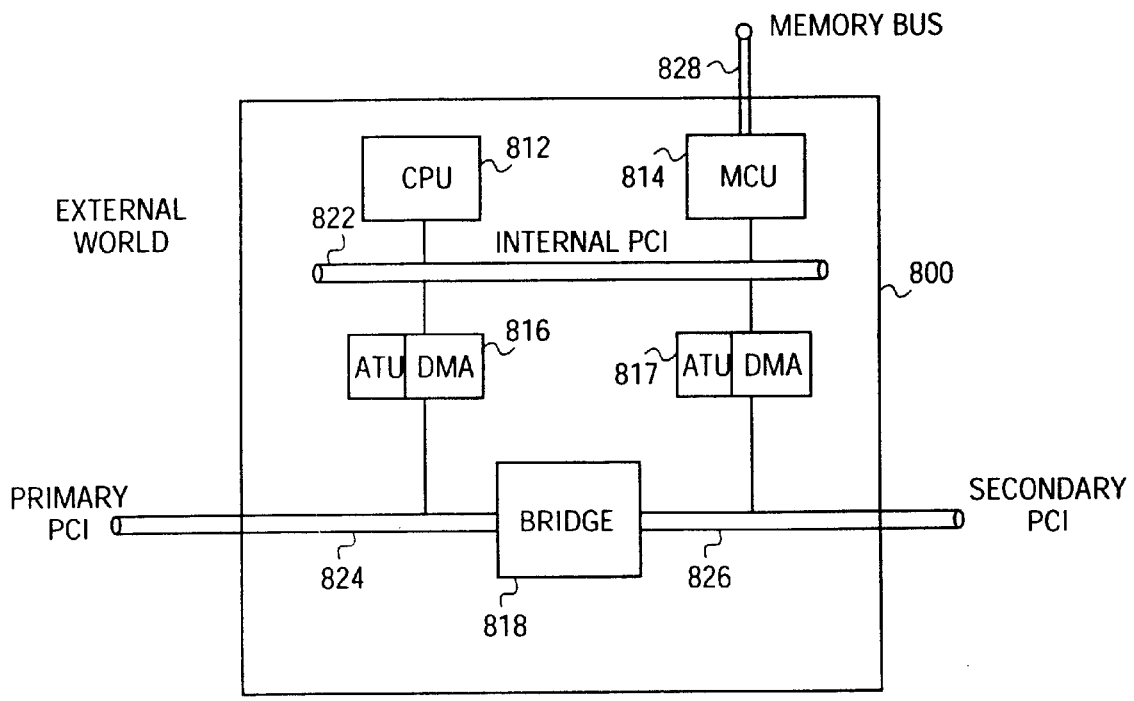
FIG. 8 is an example of an one chip solution of a computer unit in which an embodiment of the invention may be implemented.

FIG. 8 is an example of a one chip solution of a computer unit in which an embodiment of the invention may been implemented. In this example, the one chip computer unit 800 comprises a central processing unit (CPU) 812, a memory controller unit (MCU) 814, a plurality of address translation unit/direct memory access (ATU/DMA) 816, 817 and a plurality of master and slave devices (not shown), all of which are coupled to an internal PCI bus 822. The one chip computer unit 800 further comprises a PCI-to-PCI bridge 818 bridging a primary PCI bus 824 and a secondary PCI bus 826, wherein the primary PCI bus 824 and the secondary PCI bus 826 are coupled to the internal PCI bus 822 via the respective ATU/DMA units 816, 817. Note that because the internal PCI bus 822 couples the various devices within the chip 800, the internal PCI bus 822 is isolated from the external world. In other words, there is no direct access to the PCI bus 822 through external means. In accordance with an embodiment of the invention, the internal PCI bus 822 may be accessed through the memory bus 828 via the MCU 814 by providing a PCI repeater in the MCU 814. In another embodiment, the internal PCI 822 may be accessed through the primary PCI bus 824 via the ATU/DMA 816 by providing a PCI repeater in the ATU/DMA 816. Similarly, in another embodiment, the internal PCI bus 822 may be accessed through the secondary PCI bus 826 via the ATU/DMA 817 by providing a PCI repeater in the ATU/DMA 817. A specific embodiment is now described below.

Figure 9:
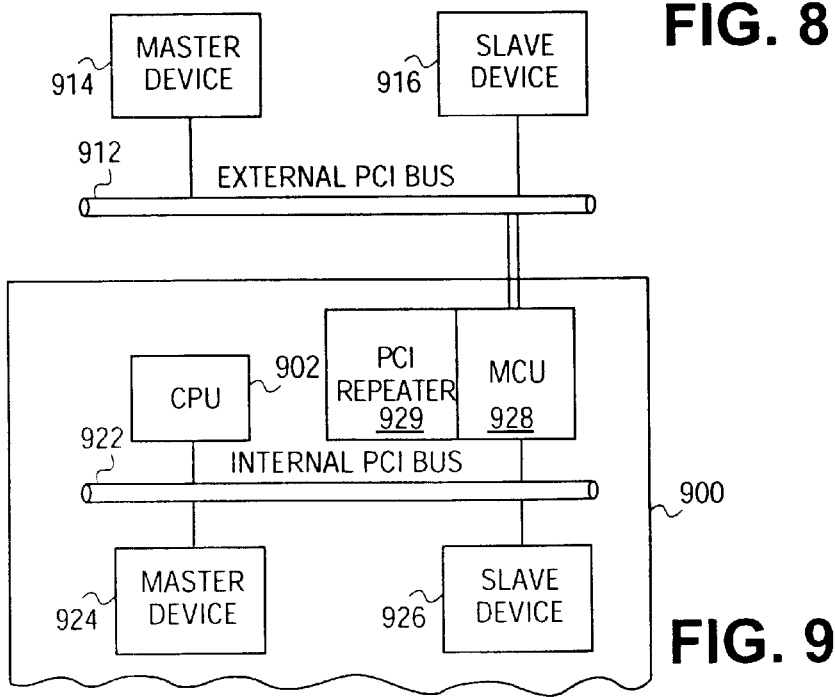
FIG. 9 illustrates an one chip computer unit in accordance with an embodiment of the invention.

FIG. 9 illustrates an one chip computer unit 900 in accordance with an embodiment of the invention. In this embodiment, the MCU 928 incorporates a PCI repeater 929 thereby allowing the read and write transactions of the internal PCI bus 922 to be mirrored to the external PCI bus 912. When the PCI repeater 929 in the MCU 928 is enabled, the external master device 914 and the external slave device 916 become "visible" to the internal master device 924 and the internal slave device 926. The enabling of the PCI repeater 929 may be performed by software or hardware. For example, the CPU 902 may transmit a command to the MCU 928 which when received alters the mode setup of the MCU 928. In this instance, the functions of the MCU 928 are disabled and the MCU interface is redefined as to allow the internal PCI bus 922 to be visible from the external PCI bus 912. The MCU interface can be redefined using multiplexing techniques. Once the MCU interface is redefined, the PCI repeater 929 takes over to provide the interaction between the internal bus 922 and the external bus 912. An embodiment of the PCI repeater has been described with respect to FIG. 5.

Figure 10:
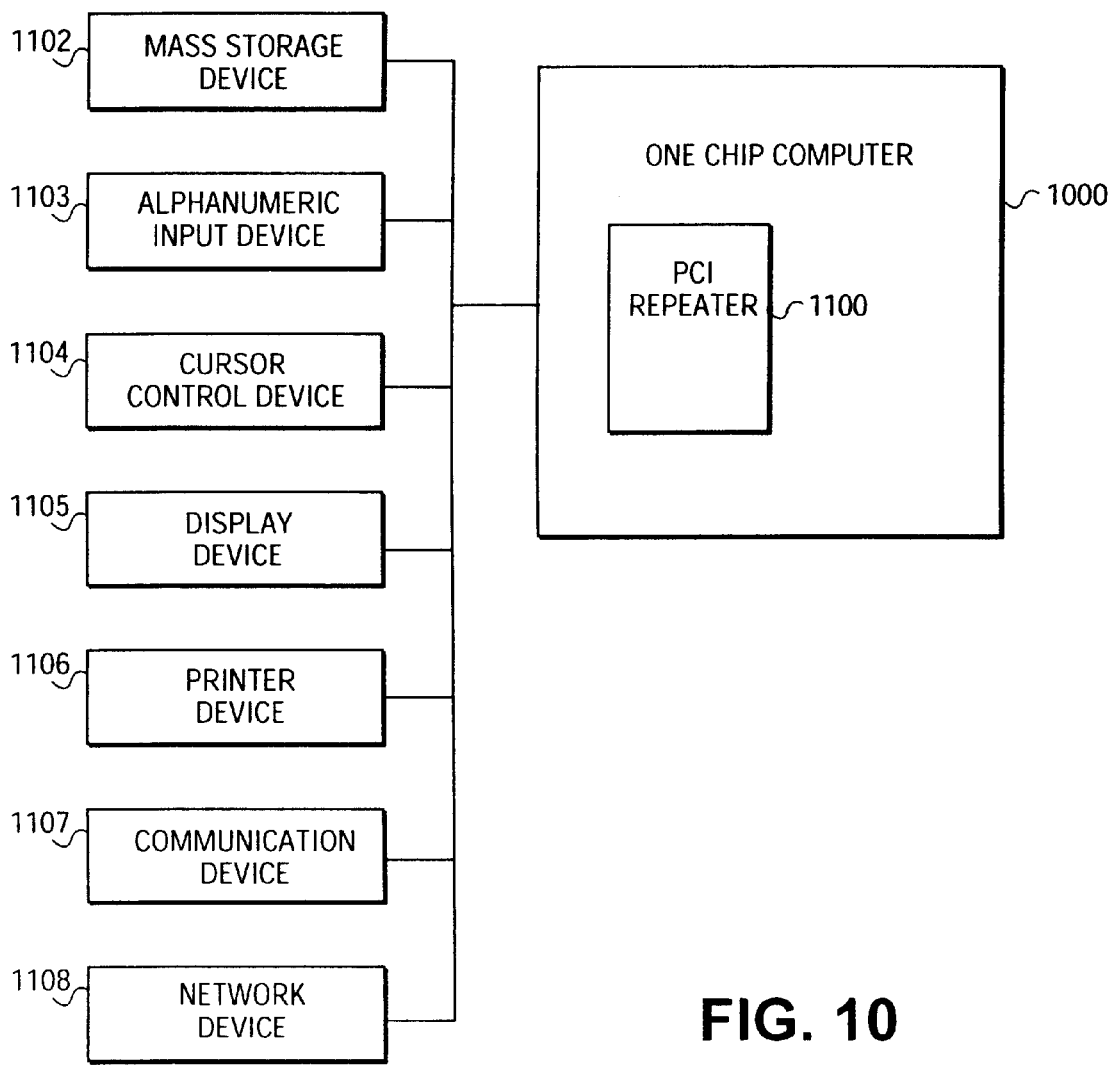
FIG. 10 is an example of a computer system using the one chip solution of a computer in accordance with an embodiment of the invention.

FIG. 10 is an example of a computer system using the one chip solution of a computer in accordance with an embodiment of the invention. Connected to the one chip computer 1000 implementing the PCI repeater 1100 as described above are a plurality of I/O peripherals such as mass storage devices 1102 such as magnetic disc drives and/or optical disc drives, an alphanumeric input device 1103 such as a keyboard, a cursor control device 1104 such as a mouse or a trackball, a display device 1105 such as a monitor or a liquid crystal display (LCD), a printer device 1106 such as a printer, a communication device 1107 such as a modem and a network interface device 1108 such as ethernet.

In the foregoing specification, the invention has been described with reference to specific embodiments thereof. It will, however, be evident that various modifications and changes can be made thereto without departing from the broader spirit and scope of the invention as set forth in the appended claims. The specification and drawings are accordingly, to be regarded in an illustrative rather than a restrictive sense.

What is claimed is:

1. An apparatus comprising:
   a plurality of buffer pairs configured to direct a plurality of signals between a first bus and a second bus in a bus cycle; and
   a controller coupled to said plurality of buffer pairs to enable at least one buffer in said buffer pairs to control a direction of said plurality of said signals between said first bus and said second bus, said controller (1) to determine a bus location of a master device, (2) to determine whether a bus cycle is one of a write cycle or a read cycle, (3) to direct data signal to the first bus if the bus cycle is the write cycle and the master device is on the second bus, and (4) to direct the data signal to the second bus if the bus cycle is the write cycle and the master device is on the first bus.

2. An apparatus as in claim 1, wherein said plurality of signals include at least a master device signal, a slave device signal, an address signal and a data signal.

3. An apparatus as in claim 2, wherein if said controller determines said master device is on said first bus by monitoring a first control signal, said controller directs said master signal and said address signal toward said second bus, and said controller directs said slave signal towards said first bus.

4. An apparatus as in claim 2, wherein if said controller determines said master device is on said second bus by monitoring a first control signal, said the controller directs said master signal and said address signal toward said first bus, and the controller directs said slave signal towards said second bus.

5. A system comprising:
a first bus;
a second bus;
a logic unit coupled to said first bus; and
a repeater coupled between said first bus and said second bus to mirror transactions occurring in one of the buses onto the other bus, said repeater including,
a plurality of buffer pairs configured to direct a plurality of signals between said first bus and said second bus in a bus cycle, and
a first circuit coupled to said plurality of buffer pairs, said first circuit configured to monitor a first control signal to determine a bus location of a master device and further configured to enable at least one buffer in said buffer pairs to control a direction of said plurality of said signals between said first and said second bus based on said bus location of said master device.

6. A system as in claim 5, further comprising a second circuit configured to disable a function of said device if said first circuit is enabled and enable said function of said device if said first circuit is disabled.

7. A system as in claim 5, wherein said plurality of signals include at least a master device signal, a slave device signal, an address signal and a data signal.

8. A system as in claim 7, wherein if said first circuit determines said master device is on said first bus by monitoring said first control signal, said first circuit directing said master signal and said address signal toward said second bus, and said first circuit directing said slave signal towards said first bus.

9. A system as in claim 7, wherein if said first circuit determines said master device is on said second bus by monitoring said first control signal, said first circuit directing said master signal and said address signal toward said first bus, and said first circuit directing said slave signal towards said second bus.

10. A system as in claim 7, further comprising:
said third circuit configured to monitor a second control signal to determine a bus location of said slave device if said bus cycle is said read cycle,
said third circuit configured to direct said data signal to said first bus if said second control signal indicates said slave device is on said second bus, and
said third circuit configured to direct said data signal to said second bus if said second control signal indicates said slave device is on said first bus.

11. A system as in claim 5, wherein the first circuit direds data signal to the first bus if the bus cycle is a write cycle and the master device is on the second bus and the first circuit directs the data signal to the second bus if the bus cycle is a write cycle and the master device is on the first bus.

12. An apparatus comprising:
a plurality of buffer pairs configured to direct a plurality of signals between a first bus and a second bus in a bus cycle;
a first circuit configured to monitor a first control signal to determine a bus location of a master device and further configured to enable one buffer in said buffer pairs to control a direction of said plurality of said signals between said first and said second bus;
wherein said plurality of signals include at least a master device signal, a slave device signal, an address signal and a data signal; and
a second circuit configured to monitor whether said bus cycle is one of a write cycle and a read cycle,
said second circuit configured to direct said data signal to said first bus if said bus cycle is said write cycle and said first control signal indicates said master device is on said second bus, and
said second circuit configured to direct said data signal to said second bus if said bus cycle is said write cycle and said first control signal indicates said master device is on said first bus.

13. An apparatus as in claim 12, further comprising:
said second circuit configured to monitor a second control signal to determine a bus location of said slave device if said bus cycle is in said read cycle,
said second circuit configured to direct said data signal to said first bus if said second control signal indicates said slave device is on said second bus, and
said second circuit configured to direct said data signal to said second bus if said second control signal indicates said slave device is on said first bus.

14. A system comprising:
a first bus;
a logic unit coupled to said first bus;
a device coupled to said first bus and configured to be coupled to a second bus, said device including,
a plurality of buffer pairs configured to direct a plurality of signals between said first bus and said second bus in a bus cycle;
a first circuit configured to monitor a first control signal to determine a bus location of a master device and further configured to enable one buffer in said buffer pairs to control a direction of said plurality of said signals between said first and said second bus;
wherein said plurality of signals include at least a mater device signal, a slave device signal, an address signal and a data signal; and
a third circuit configured to monitor whether said bus cycle is one of a write cycle and a read cycle,
said third circuit configured to direct said data signal to said first bus if said bus cycle is said write cycle and said first control signal indicates said master device is on said second bus, and
said third circuit configured to direct said data signal to said second bus if said bus cycle is said write cycle and said first control signal indicates said master device is on said first bus.

15. A method comprising:
determining a bus location of a master device;
determining whether a bus cycle is one of a write cycle or a read cycle;
enabling at least one buffer in a plurality of buffer pairs to control a direction of a plurality of signals between a first bus and a second bus;
directing data signal to the first bus if the bus cycle is the write cycle and the master device is on the second bus; and
directing data signal to the second bus if the bus cycle is the write cycle and the master device is on the first bus.

16. A method as in claim 15, further comprising:
directing a master device signal and an address signal to the second bus if the master device is on the first bus; and
directing a slave device signal to the first bus if the master device is on the first bus.

17. A method as in claim 15, further comprising:

directing a master device signal and an address signal to the first bus if the master device is on the second bus; and directing a slave device signal to second first bus if the master device is on the second bus.

18. A method as in claim 15, further comprising:

determining a location of a slave device;

directing data signal to a second bus if the slave device is located on the first bus and the bus cycle is the read cycle; and directing data signal to a first bus if the slave device is located on the second bus and the bus cycle is the read cycle.

* * * * *

UNITED STATES PATENT AND TRADEMARK OFFICE
CERTIFICATE OF CORRECTION

PATENT NO.    : 6,567,871 B2
DATED         : May 20, 2003
INVENTOR(S)   : Koh et al.

It is certified that error appears in the above-identified patent and that said Letters Patent is hereby corrected as shown below:

<u>Column 4,</u>
Line 35, after "write cycle", insert -- or a read cycle --.

Signed and Sealed this

Sixteenth Day of December, 2003

JAMES E. ROGAN
*Director of the United States Patent and Trademark Office*